INVENTOR.
ROBERT HOFSTADTER
BY
William H. Brown

United States Patent Office 3,342,745
Patented Sept. 19, 1967

3,342,745
EUROPIUM ACTIVATED CALCIUM IODIDE SCINTILLATORS
Robert Hofstadter, Stanford, Calif., assignor, by mesne assignments, to Kewanee Oil Company, Bryn Mawr, Pa., a corporation of Delaware
Filed July 22, 1963, Ser. No. 296,518
5 Claims. (Cl. 252—301.4)

This invention relates to new and improved scintillators and, more specifically, to scintillators wherein the host material is calcium iodide and the activator material is europium.

Prior to the present invention, Van Sciver and Hofstadter, Physical Review, 84 (5) (Dec. 1, 1951) have described thallium activated calcium iodide and thallium activated caesium iodide. Thallium activated calcium iodide was reported as not superior to thallium activated sodium iodide in respect to pulse height. The integrated light output was described as being about 10% more for $CaI_2$ (Tl) than for NaI (Tl).

$CaI_2$ crystallizes in the hexagonal system and has a pronounced basal cleavages. It is more hygroscopic than NaI and is not readily machinable. The basal cleavage properties cause the material to behave somewhat like mica. It is also less resistant to thermal shock than NaI.

$CaI_2$ (Tl) has thus several drawbacks. Because of these and the relatively small advantages, $CaI_2$ (Tl) has not commercially replaced NaI (Tl) to any extent so far as known to applicant. $CaI_2$ (Tl) has nothing about it of such great value as to cause it to replace NaI (Tl).

Europium activated calcium iodide, on the other hand, has not only the drawbacks noted but some marked advantages over NaI (Tl) which makes the material attractive in spite of the drawbacks. $CaI_2$ (Eu) is superior to NaI (Tl) in respect to pulse height. It is superior in some other respects as well, e.g. in respect to resolution. NaI (Eu) has not been tested because of inability to put the europium into solution in the NaI in sufficient proportion to determine its properties.

An object of the invention is to provide a novel phosphor comprising europium activated calcium iodide. Preferably the phosphor should be transparent to visible light and monocrystalline, but it may be polycrystalline and even finely divided. Finely divided powder may be used in making oscillograph or TV tube phosphor screens. A further object is to provide a phosphor comprising calcium iodide activated with from 0.002 to 1.0 mole percent of europium.

A further object is to provide a novel method of making europium activated calcium iodide. Other objects will become apparent as the description proceeds.

Figure 1:
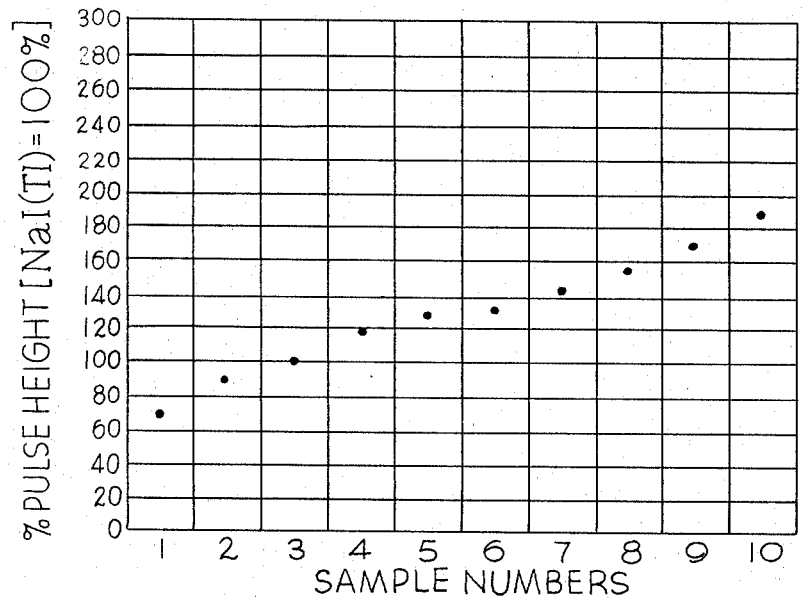

FIG. 1 is a graphic representation of the pulse heights of $CaI_2$ (Eu), the average pulse height of NaI (Tl) being taken as 100%. The thallium content of the standard NaI (Tl) is about 0.1 wt. percent. Increase of the thallium content beyond 0.1% by weight makes little or no difference in pulse height, a plateau being reached below that value.

Figure 2:
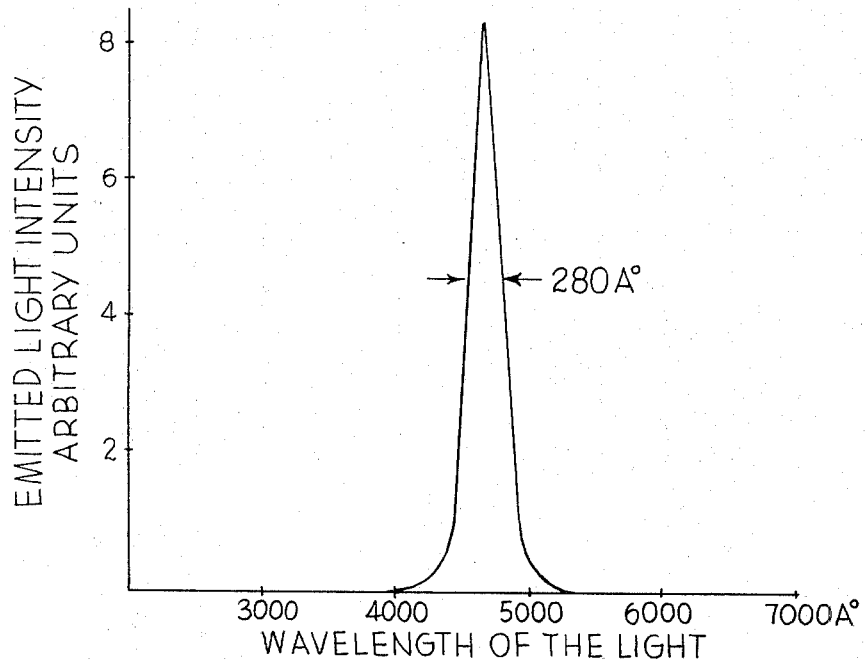

FIG. 2 is an emission spectrum characteristic of $CaI_2$ (Eu) phosphor in accordance with the invention for the light evolved upon excitation with gamma radiation from cobalt-60. Light intensity is shown in arbitrary units as measured by cathode current of a photomultiplier detector on the spectrophotometer in a scan of wavelength from 3000 A. to 7000 A. Correction for grating efficiency and photomultiplier response were not made but are known to be less than 1½% of the light intensity shown. FIG. 2 shows a peak at about 4700 A. and a width at half height of 280 A.

$CaI_2$ (Eu) should contain at least 0.002 and preferably from about 0.002 to about 1.0 suitably from .002 to .005 mole percent europium, percentages based on $CaI_2$. This material may be produced in the Kyropoulos furnace or it may be produced in a Stockbarger type or other type furnace provided water and oxygen can be excluded from the atmosphere over the melt. Material within the scope of the invention has been produced which exhibited pulse heights as high as from about 100 to about 180 percent of the NaI (Tl) standard.

It is thus seen that $CaI_2$ (Eu) is to some extent an improvement over Na (Tl). This fact should lead to usage of $CaI_2$ (Eu) in spite of its shortcomings in respect to deliquescence, cleavage and machinability.

Its decay constant is ½ to 1 microsecond. During one decay constant time interval the intensity falls to $1/e$ of the peak intensity, $e$ being the natural logarithmic base. The $CaI_2$ may contain, in trace quantities, Al, Ba, B, Cr, Cu, Fe, Pb, Mg, Mn, Si, Na, and Sr. The europium may be introduced as a europium halide, preferably the chloride or as europium sulfide.

Example

A 19 mm. O.D. fused quartz or Vycor [Vycor is very similar to fused quartz being fused silica about 96% $SiO_2$] ampoule is loaded with approximately 50 grams of $CaI_2$, containing approximately 0.02% of its weight of europic chloride, in a dry box and evacuated and baked at temperatures between 200 to 250° C. for sufficient time to drive out residual moisture and air (6 to 18 hours, suitably 12 hours). The ampoule is then sealed and transferred to a Stockbarger type furnace with top zone at about 800° C. and bottom zone about 650° C. After the material is molten, the ampoule is shaken to distribute the activator through the charge, then the elevator is started down with a speed of 4 to 6 millimeters per hour. When the material is solidified, the ampoule is cooled to room temperature in a container filled with insulating material such as Perlite or loose asbestos. The resulting crystal consists of single or multiple crystal sections, containing in the clear zone 0.003 to 0.005% europium, which may show a series of parallel cleavages. Using pieces of material so produced as scintillators in connection with a photomultiplier tube and pulse height analyzer, pulse heights are measured. The scintillators produced according to the above can be expected to yield a major portion of single crystal pieces capable of producing pulses of height above the NaI (Tl) standards. While material produced according to the foregoing may be either single or multiple, the multiple crystals will ordinarily be composed of only a few crystals and the term "single crystal" is understood to include multiple crystals of only a few (say up to 8 or 10) component crystals as well as true single crystals. It is sometimes possible to saw or cleave true single crystals out of slightly multiple crystals. Single crystals of minimum dimension not less than one millimeter, preferably not less than 0.5 cm. can be used according to the invention. Preferably the crystal should be at least 1 mm. thick, at least ½ cm. in length and ½ cm. in breadth.

The europium may be introduced into the $CaI_2$ as europium chloride, europium iodide or any halide of europium or as europium sulfide or any europium compound which will dissolve in molten $CaI_2$. On cooling, the europium compound forms a solid solution with the $CaI_2$. The europic compounds are preferable. The respective samples vary in europium content and oxygen impurity. It can be seen that there is an optimum europium content and impurity content to give maximum pulse height. In any case most of these particular samples have a pulse height well over that of NaI(Tl).

A remelt material is superior in scintillation power to the original material not remelted. Remelting may be carried out one or more times.

As seen from the foregoing, the invention has utility in the production of scintillator materials and, in turn, these are useful in the production of radiation detectors. For example, material of the kind described can be placed adjacent the photo-cathode of a photomultiplier tube. Preferably, this material is optically coupled to the photomultiplier. With this arrangement, scintillations will be produced when radiation impinges on such scintillation material, light being applied as a result to the photo-cathode of the photomultiplier. The output of the photomultiplier can then be read by means among others of a multi-channel pulse height analyzer or by a counter or oscilloscope.

Various samples of $CaI_2$ (Eu) phosphors produced percent pulse heights relative to NaI (Tl) as follows:

| Sample No. | Percent pulse height for excitation by $Cs^{137}$ |
|---|---|
| 1 | 71 |
| 2 | 92 |
| 3 | 100 |
| 4 | 119 |
| 5 | 129 |
| 6 | 131 |
| 7 | 146 |
| 8 | 156 |
| 9 | 170 |
| 10 | 189 |

FIG. 1 is based on the above data. Percent pulse height is based on the pulse height of NaI (Tl) as 100%, the thallium content being approximately 0.1 wt. percent. The light conversion efficiency of NaI (Tl) is reported to be 12½%. That of $CaI_2$ (Tl) approximates 25% on an energy for energy basis. Thus, the efficiency of $CaI_2$ (Eu) is much greater essentially in proportion to measured pulse height. The emission peak for $CaI_2$ (Eu) is at approximately 4700 A., for excitation by radium or cobalt-60 (see FIG. 2), and is blue in color for 3600 A., or 2500 A., ultraviolet. The width at half height of the emission peak is 280 A.

Having thus described the invention, what is claimed is:

1. A scintillator material transparent to its own emanations, essentially consisting of calcium iodide activated by europium dispersed in solid solution therein, said europium being present to the extent of from approximately 0.002 to approximately 1.0 mole percent.

2. A method of producing a scintillator crystal essentially consisting of drying under vacuum calcium iodide and a europium compound soluble in molten calcium iodide in quantity to yield on heating from 0.002 to 1.0 mole percent of europium, said drying being continued to approximate equilibrium at 200° C. to 250° C. whereby such material is substantially dry and free from air, sealing such material in a crucible, thereafter heating such material until it is in a molten condition, and slowly reducing the temperature of the melt until such material has cooled to solid state by slowly passing the melt from a region held at a temperature above its melting point to a region held at a temperature below its melting point.

3. A scintillator essentially consisting of a crystal of calcium iodide activated by europium in solid solution therein, said europium being present in said crystal in concentration from approximately 0.003 to 0.005 mole percent.

4. A scintillator crystal essentially consisting of calcium iodide activated by europium dispersed therein, said europium being present to the extent of approximately from 0.002 to 1.0 mole percent, and said scintillator being transparent to visible light, and containing true monocrystalline regions at least one-half millimeter thick, one-half centimeter wide, and one-half centimeter long.

5. A process for detecting radiation comprising irridating a calcium iodide phosphor with said radiation, said phosphor being activated by from approximately 0.002 to approximately 1.0 mole percent of europium, and measuring the emitted light.

References Cited

UNITED STATES PATENTS

| 2,719,127 | 9/1955 | Schenck | 252—301.4 |
| 2,984,626 | 5/1961 | Lefever | 252—301.4 |

OTHER REFERENCES

Curran: "Luminescence and the Scintillation Counter," Academic Press Inc. New York (1953) pages 115–116.

Kroger: "Some Aspects of the Luminescence of Solids," Elsevier Pub., Co., New York (1948) pages 270, 171, and 279.

TOBIAS E. LEVOW, *Primary Examiner.*

R. D. EDMONDS, *Assistant Examiner.*